3,401,162
S-VINYLTHIAMINE DERIVATIVES
Raffaello Fusco, Milan, and Franco Tenconi, Monza, Milan, Italy, assignors, by mesne assignments, to Warner-Lambert Pharmaceutical Company, Morris Plains, N.J., a corporation of Delaware
No Drawing. Filed June 22, 1964, Ser. No. 377,120
Claims priority, application Italy, June 25, 1963, 13,355/63; Nov. 20, 1963, 23,676/63
10 Claims. (Cl. 260—240)

ABSTRACT OF THE DISCLOSURE

There have been discovered new S-vinylthiamine derivatives represented by the following general formula:

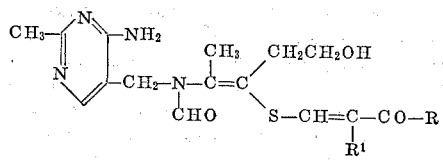

wherein $R^1$ represents hydrogen, lower alkyl of from 1 to 3 carbon atoms or aryl and R represents alkyl, cycloalkyl or a grouping having the formula:

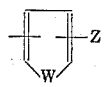

wherein W represents oxygen, sulphur, vinylene or azomethine and Z represents hydrogen, a halogen atom, e.g. fluorine, bromine or particularly chlorine, lower alkyl, hydroxy, lower alkoxy, mercapto-lower alkyl, amino, N-lower alkyl-amino, N,N-di-lower alkylamino, nitro, carboxy, lower carbalkoxy or cyano. The substituents attached to the ring may be in any of the available positions.

These compounds and their non-toxic acid addition salts possess remarkable vitamin $B_1$ activity. They are readily absorbed by oral administration and the absorption is proportional to the dosage. Thus, the compounds of the invention may provide vitamin $B_1$ levels in blood and organs higher than obtained with thiamine and its known derivatives. Besides, they are odorless and, therefore, particularly useful as nutritional supplements for foods and animal feedstuffs.

The compounds of the invention are also therapeutically useful for the treatment of conditions resulting from vitamin $B_1$ deficiency. For this purpose they can be formulated for administration by oral, parenteral or intraduodenal route together with a non-toxic pharmaceutical carrier. The compositions are in dosage unit form containing the active ingredient in an amount from 5 to 250 mg. The administration is advantageously in equal doses one or more times daily to give a daily dosage of from 15 to 1000 mg. and preferably from 30 to 500 mg.

---

This invention relates to a new series of organic compounds having vitamin $B_1$ activity. More particularly, the invention relates to new S-vinylthiamine derivatives and to a method for their preparation.

It is known (Annales of the New York Academy of Sciences, 98, 430; 1962) that the absorption of vitamin $B_1$ administered by oral route is very poor and is not in proportion to the dosage taken but it remains practically constant thus greatly increasing the dosage itself.

In order to increase absorption of vitamin $B_1$, several derivatives of thiamine have been prepared. By treating the thiol-form of thiamine with an acylating agent, S-acyl-thiamine derivatives have been obtained which are better absorbed than thiamine itself but are not stable compounds.

By reaction of the thiol-form of thiamine with sulphur-containing derivatives, particularly with a sodium alkylthiosulphate, disulphate compounds are obtained which both in vitro and in vivo release thiamine giving high vitamin $B_1$ levels in the blood and in various internal organs. These disulphide compounds present however typical disadvantages; they have an unpleasant mercapto-like odor which makes them unfit for practical uses, particularly for alimentary and dietetic purposes.

In order to obtain vitamin $B_1$ derivatives which are stable and without odor, S-alkylthiamine derivatives have been prepared by treating the thiol-form of thiamine with an alkyl halide. These S-alkylthiamines are stable compounds but have no vitamin $B_1$ activity because they are not converted into thiamine in the body.

There has now been found a new series of thioethers of thioamine which, unexpectedly, possess high and prolonged vitamin $B_1$ activity.

The new thioethers of this invention are S-vinylthiamine derivatives represented by the following general formula:

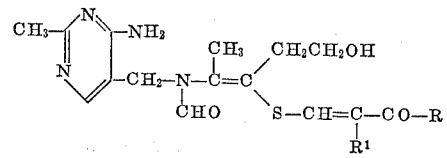

wherein $R^1$ represents hydrogen, lower alkyl of from 1 to 3 carbon atoms or aryl and R represents alkyl, cycloalkyl or a grouping having the formula:

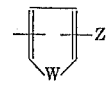

wherein W represents oxygen, sulphur or vinylene or and Z represents hydrogen, a halogen atom, e.g. fluorine, bromine or particularly chlorine, lower alkyl, hydroxy, lower alkoxy, mercapto-lower alkyl, amino, N-lower alkyl-amino, N,N-di-lower alkylamino, nitro, carboxy, lower carbalkoxy or cyano. The substituents attached to the ring may be in any of the available positions.

As used herein, the term "alkyl" is intended to include straight or branched alkyl radicals containing from 1 to 10 carbon atoms, inclusive, e.g. methyl, ethyl, propyl, isopropyl, butyl, ter-butyl, isobutyl, amyl, isoamyl, hexyl, heptyl, octyl and so on; "lower alkyl" is intended to include aliphatic groups having not more than 5 carbon atoms such as methyl, ethyl, propyl, isopropyl, butyl, amyl and isoamyl; "lower alkoxy" is intended to include methoxy, ethoxy, propoxy, butoxy and amyloxy.

The term "cycloalkyl" is used herein to represent a cycloaliphatic group having from 3 to 6 carbon atoms such as cyclopropyl, cyclobutyl, cyclopentyl and cyclohexyl; and "aryl" is intended to mean phenyl or substituted phenyl.

The aliphatic and cycloaliphatic hydrocarbon radicals represented by R may contain functional groups as additional substituents. Such substituents are for example halogen atoms, particularly chlorine; halogeno-substituted lower alkyl radicals, e.g. trifluoro-methyl; hydroxy, lower alkoxy such as methoxy, ethoxy and the like. Other substituents may be amino groups, N-lower alkyl-amino groups such as N-methylamino and ethylamino, N,N-di-lower alkyl-amino groups, e.g. N,N-dimethylamino or diethylamino.

A preferred group of compounds are those of the above structural Formula I, in which $R^1$ is hydrogen or phenyl and R is lower alkyl, phenyl, tolyl, 2-furyl, 2- thienyl, 3-furyl, 3-thienyl, p-methoxyphenyl, p-ethoxyphenyl, p-chlorophenyl, p-lower alkyl-mercapto-phenyl such as p-ethyl-mercapto-phenyl, p-isopropyl-mercapto-phenyl and p-isoamyl-mercapto-phenyl, carboxyphenyl or nitrophenyl.

This invention also includes non-toxic acid addition salts of the above defined compounds with organic or inorganic acids, for example hydrohalic acids, such as hydrochloric, hydrobromic or hydriodic acid, sulphuric, phosphoric, acetic, propionic, lactic, oxalic, succinic, maleic, tartaric, citric, benzoic, mandelic, methanesulphonic, salicylic and the like.

The S-vinylthiamine derivatives of this invention and their salts possess remarkable vitamin $B_1$ activity; they are readily absorbed by oral administration and the absorption is proportional to the dosage. Thus, the compounds of the invention may provide vitamin $B_1$ levels in blood and organs higher than obtained with thiamine and its known derivatives. Besides, they are odourless and, therefore, particularly useful as nutritional supplements for foods and animal feedstuffs.

The compounds of the invention are also therapeutically useful for the treatment of conditions resulting from vitamin $B_1$ deficiency. For this purpose they can be formulated for administration by oral, parenteral or intraduodenal route together with a non-toxic pharmaceutical carrier. The compositions are in dosage unit form containing the active ingredient in an amount of from 5 to 250 mg. The administration is advantageously in equal doses one or more times daily to give a daily dosage of from 15 to 1000 mg. and preferably from 30 to 500 mg.

The S-vinylthiamine derivatives of the invention are obtained by treating thiamine or a metal salt thereof with a reagent of the formula:

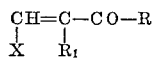

wherein R and $R^1$ are as defined above and X is halogen, particularly chlorine. The metal salt of the thiol-form of thiamine may be an alkali metal salt, such as sodium, potassium or lithium, or an alkaline-earth metal salt or the ammonium salt.

Generally the reaction is carried out in a solvent which may be water, an aqueous water-miscible organic solvent or an anhydrous organic solvent such as benzene, toluene, hexane, methanol, ethanol, isopropanol, diethyl ether, dioxane, tetrahydrofurane or their mixtures. The reaction is preferably carried out at a temperature between −20° C. and the boiling point of the solvent utilized; generally the reaction is accomplished after a period of from 3 to 30 hours at temperatures between −5 and +30° C.

The compound which separates at the end of the reaction may be isolated and purified following standard procedures, for example by simple filtration or by evaporation of the solvent and suitable recrystallization.

It has been noted that the compound thus obtained does not show always the same physical properties, though it possesses always the same skeletal structure. Particularly the melting point of the S-vinylthiamine derivative may vary depending upon the operative conditions used during the reaction. Often, but not necessarily, the compound may be obtained in two polymorphic forms, one having a lower melting point and the other having a higher melting point.

Without limiting in any way the scope of the invention, one may theorize that the physical properties of the S-vinylthiamine derivatives are correlated with their chemical configuration. By examining the general formula one sees that a vinylene group is present in the molecule and it is known from the literature that compounds containing a vinylene double bond may exist as two geometrical isomers having identical structure but different physical properties, the so called isomers of cis-trans configuration. Therefore, by analogy, it is quite possible that also in the present case an isomerism of cis-trans type results.

Many factors may affect the formation of one rather than the other isomer, for example the polarity of the reaction solvents, the reactivity of the reactants and the structure of the halo vinylketone starting reagent.

It is to be understood, therefore, that the novel compounds, as generically described and claimed, are intended to embrace each of these isomers as well as mixtures thereof.

The halo vinylketone starting reagents are prepared according to known procedures (see for example C. A. 49, 10838g) by reacting the appropriate ketone of the formula $R^1CH_2$—CO—R, wherein R and $R^1$ are as defined above, with a lower alkyl formate, e.g. ethyl formate, in the presence of an alkali metal, particularly sodium metal, then acidifying with dilute sulphuric acid and subjecting the resulting compound to halogenation, e.g. chlorination with thionyl chloride.

The following examples are illustrative of the invention (all the melting points being non-corrected).

EXAMPLE 1

(a) To a suspension of 3 g. of sodium salt of the thiol-form of thiamine in 50 cc. of anhydrous diethyl ether there are added 1.5 g. of 1-chloro-3-phenyl-propene-3-one and the resulting mixture is shaken at room temperature for about 20 hours. The light yellow product which precipitates is filtered, washed with water and dried. The product is further washed several times with anhydrous ether to give 2.95 g. of S-(2-benzoyl)vinylthiamine; M.P. 142–143° C. The base is treated at room temperature with an alcoholic solution of hydrochloric acid to give S-(2-benzoyl)vinylthiamine hydrochloride, M.P. 182–184° C.

(b) To a solution of 3.3 g. of thiamine hydrochloride in 10 cc. of water there are added slowly 12 cc. of a 10% sodium hydroxide solution at −5° C. After 15 minutes, 1.5 g. of 1-chloro-3-phenyl-propene-3-one are slowly dropped into the solution maintained always at −5° C. During the addition a yellowish crystalline product commences to separate. After 5 hours, the reaction being completed, the precipitate is filtered, washed thoroughly with water to eliminate the chloride ions, dried and washed again with ether and methyl-ethylketone. After recrystallization from anhydrous methyl alcohol, there is obtained S-(2-benzoyl)vinylthiamine having the melting point 204° C.

EXAMPLE 2

(a) To a solution of 3 g. of the sodium salt of thiamine in 50 cc. of anhydrous ethyl alcohol, there are added slowly 1.3 g. of 1-chloro-1-hexene-3-one. The resulting mixture is maintained for 5 hours at room temperature after which the sodium chloride is filtered off. The solvent is evaporated, the residue dissolved in chloroform and washed with water. The organic solution after drying over sodium sulphate is evaporated to dryness and the residue is crystallized from ethyl acetate to give S-(2-n-butyryl)vinylthiamine; M.P. 144–146° C.

The base is treated with an alcoholic solution of oxalic acid and converted into the oxalate. Similarly, hydrochloride and hydrobromide salts are prepared.

(b) To a solution of 3.35 g. of thiamine hydrochloride in 10 cc. of water there are added slowly 12 cc. of a 10% sodium hydroxide solution at a temperature of −5° C. After 15 minutes, 1.3 g. of 1-chloro-1-hexene-3-one are slowly dropped into the solution, maintained always at −5° C.

During the addition a crystalline product commences to separate and after 5 hours, the reaction being completed, the precipitate is filtered, washed thoroughly with water to eliminate the chloride ions and crystallized from ethyl acetate to give S-(2-n-butyryl)vinylthiamine melting at 144–146° C.

The other form of S-(2-n-butyryl) vinylthiamine with lower melting point melts at 124–126° C.

EXAMPLE 3

A solution of 5 g. of sodium salt of thiamine in 50 cc. of anhydrous ethyl alcohol is treated under stirring at room temperature with 2 g. of 1-chloro-2-methyl-3-phenyl-propene-3-one. Stirring is continued at room temperature for about 5 hours after which the sodium chloride is filtered off and the solvent is evaporated to dryness. The residue is washed with water and dried to give S-(2-methyl-2-benzoyl)vinylthiamine; M.P. 133–134° C.

EXAMPLE 4

By following the procedure described in Example 3 and treating the potassium salt of thiamine with 1-chloro-2,3-diphenyl-propene-3-one the corresponding S-(2-phenyl-2-benzoyl)vinylthiamine is obtained; M.P. 167–168° C.

EXAMPLE 5

A suspension of the sodium salt of thiamine (1 g.) in 20 cc. of anhydrous ether is treated, under stirring at room temperature, with 0.5 g. of 1-chloro-6-methyl-1-heptene-3-one. The mixture is maintained under stirring at room temperature for about 3 hours, then the precipitate is filtered and washed several times with water and dried. My recrystallization from ethyl acetate S-2($\gamma$-methyl-valeryl)vinylthiamine is obtained, melting at 120° C.

Following the same procedure, S-(2-propionyl)vinylthiamine, M.P. 168–169° C., S-(2-isobutyryl)vinylthiamine, M.P. 134–135° C. and S-(2-caproyl)vinylthiamine are prepared.

EXAMPLE 6

By following the procedure of Example 3 and treating the sodium salt of thiamine in ethanol solution with 1-chloro-1-butene-3-one, the S-(2-acetyl)vinylthiamine is obtained which, after recrystallization from anhydrous ethanol, melts at 174–175° C. In the same manner the S-(2-phenyl-2-acetyl)vinylthiamine is obtained which, after recrystallization from anhydrous ethanol, melts at 193–194° C.

EXAMPLE 7

To a solution of 3 g. of the ammonium salt of thiamine in 30 cc. of anhydrous ethyl alcohol there are added, at room temperature with stirring, 0.9 g. of 1-chloro-2-methyl-1-butene-3-one.

By following the procedure described in Example 3, S-(2-methyl-2-acetyl)vinylthiamine is obtained in 75% yield. After recrystallization from anhydrous ethanol the product melts at 183–186° C.

EXAMPLE 8

A suspension of 3 g. of the sodium salt of thiamine in 50 cc. of anhydrous ethyl ether is treated with 2 g. of 1-chloro-3-(2'-thienyl)-propene-3-one and the mixture is shaken at room temperature for about 20 hours The precipitate is filtered and washed with water-ether to give S-[2-(2'-thienoyl)]vinylthiamine in 65% yield; M.P. 144–145° C.

The base treated with an alcoholic solution of hydrochloric acid gives the S-[2-(2'-thienoyl)]vinylthiamine hydrochloride; M.P. 190–191° C.

EXAMPLE 9

A solution of the sodium salt of thiamine in anhydrous ethyl ether is treated as usual at room temperature with 1-chloro-3-p-methoxyphenylpropene-3-one. The reaction mixture is allowed to stand at room temperature for 10 hours, then the sodium chloride which separates is filtered off, the solvent is evaporated to dryness and the residue washed with water several times and dried. S-(2-p-methoxybenzoyl)vinylthiamine is obtained in 50% yield at melting point 157–159° C. after recrystallization from ethyl acetate. In the same manner, S-(2-p-chlorobenzoyl)vinylthiamine, M.P. 157° C., S-(2-p-toluyl)vinylthiamine, M.P. 155–158° C., S-(2-p-carbethoxybenzoyl)vinylthiamine, S-(2-p-carboxybenzoyl)vinylthiamine and S-(2-p-nitrobenzoyl)vinylthiamine are obtained.

EXAMPLE 10

By following the same procedure as in Example 8 and treating in anhydrous ether the potassium salt of thiamine with 1 - chloro - 3 - p - isoamylthiophenyl - propene - 3 - one (B.P. 155–160° C./0.4 mm.), S - (2 - p-isoamylthiobenzoyl)vinylthiamine is obtained, which after recrystallization from ethyl acetate melts at 137° C.

In the same manner S - (2 - p - ethylthiobenzoyl)vinylthiamine and S - (2 - p - isopropyl)vinylthiamine are prepared.

EXAMPLE 11

To a suspension of 3 g. of the sodium salt of thiamine in 50 cc. of anhydrous ether are added 1.5 g. of 1 - chloro - 3 - (2' - furyl) - propene - 3 - one and the mixture is shaken at room temperature for about 20 hours. The crystalline product which separates off is filtered and washed several times with water to give S - [2 - (2'-pyromucyl)]vinylthiamine. The product recrystallized from anhydrous ethanol melts at 150° C.

By treatment with an alcoholic solution of hydrochloric acid, the corresponding hydrochloride is obtained with M.P. 179–180° C.

EXAMPLE 12

Biological tests

The compounds of this invention are readily converted to thiamine by homogenates of animal organs. Type I shows the percentage of conversion for some representative compounds of the invention when incubated with brain, heart, liver, kidney and intestine homogenates of normal rats. The incubation lasted for an hour at 37° C. and pH 7.4 and S - benzoylthioamine monophosphate was used as the reference compound.

TABLE I

| Compound | Brain | Heart | Liver | Kidney | Intestine |
|---|---|---|---|---|---|
| S-benzoylthiamine monophosphate | 16 | 22 | 30 | 80 | 43 |
| S-(2-benzoyl)vinylthiamine | 100 | 100 | 100 | 100 | 90 |
| S-[2-(2'-thenoyl)]vinylthiamine | 100 | 100 | 100 | 100 | 90 |
| S-[2-(2'-pyromucyl)]vinylthiamine | 100 | 100 | 100 | 100 | 100 |
| S-(2-p-isoamylthiobenzoyl)vinylthiamine | 100 | 100 | 100 | 100 | 100 |
| S-(2-p-chlorobenzoyl)vinylthiamine | 100 | 100 | 100 | 100 | 100 |
| S-(2-p-methoxybenzoyl)vinylthiamine | 100 | 100 | 100 | 100 | 100 |
| S-(2-p-toluyl)vinylthiamine | 100 | 100 | 100 | 100 | 95 |

From the table it results that the S - vinylthiamine derivatives are converted to thiamine by the homogenates of different organs in an amount larger than the S - acyl compound.

The vitamin $B_1$ activity of S - vinyl derivatives of the invention was assayed in vivo on experimental animals and precisely on rats held on a vitamin $B_1$-free diet for 15–20 days. Afterwards the compound was given by gastric sound at the daily dose of 0.3 μm. for four days to rats in a state of avitaminosis. The animals were sacrificed on the 5th day and the thiamine content (μg./g.) in brain, heart, liver and kidney was determined.

Table II shows the results obtained with some representative compounds of this invention in comparison with those obtained using thiamine hydrochloride.

TABLE II

| Compound | Dose, μm. | Thiamine content | | | |
|---|---|---|---|---|---|
| | | Brain | Heart | Liver | Kidney |
| Thiamine hydrochloride | 0.3 | 1.8 | 3.2 | 2.85 | 2.25 |
| S-(2-benzoyl)vinylthiamine hydrochloride | 0.3 | 1.82 | 3.35 | 3.26 | 2.26 |
| 2-[2-(2'-thenoyl)]vinylthiamine hydrochloride | 0.3 | 1.95 | 3.45 | 4.35 | 3.66 |
| S-[2-(2'-pyromucyl)]vinylthiamine hydrochloride | 0.3 | 2.10 | 2.80 | 5.60 | 5.10 |
| S-(2-p-isoamylthiobenzoyl)vinylthiamine hydrochloride | 0.3 | 2.45 | 5.50 | 2.90 | 2.68 |
| S-(2-p-toluyl)vinylthiamine hydrochloride | 0.3 | 2.50 | 6.0 | 4.20 | 3.60 |
| S-(2-p-chlorobenzoyl)vinylthiamine hydrochloride | 0.3 | 1.94 | 5.68 | 3.68 | 3.28 |
| S-(2-p-methoxybenzoyl)vinylthiamine hydrochloride | 0.3 | 2.28 | 3.45 | 4.17 | 3.61 |
| S-(2-propionyl)vinylthiamine hydrochloride | 0.3 | 2.16 | 2.22 | 3.31 | 2.71 |

From this table it results that the compounds of this invention provide higher levels of thiamine content in the different organs.

Vitamin $B_1$ activity was demonstrated in man by administering compounds of the invention in a single dose to healthy human beings. The hematic thiamine was measured in samples of blood drawn before the administration of the compounds and 2, 4, 8 and 24 hours after this administration.

In Table III are reported the average values of thiamine determined in every sample and the percent variations from the starting values. Thiamine hydrochloride was utilised as standard compound (No. 1 of the table). The other tested compounds were:

S - 2 - benzoyl)vinylthiamine (No. 2); S - (2 - phenyl - 2 - benzoyl)vinylthiamine (No. 3); S - [2 - (2' - thenoyl)] vinylthiamine (No. 4); S - [2 - (2' - pyromucyl)]vinylthiamine (No. 5); S - (2 - p - isoamylthiobenzoyl)vinylthiamine (No. 6)

10 carbon atoms, cycloalkyl of from 3 to 6 carbon atoms, a grouping having the formula

wherein W is selected from the group consisting of oxygen and sulphur and a grouping of the formula

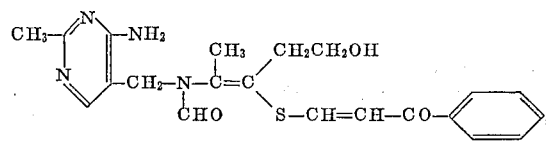

wherein Z is selected from the group consisting of hydrogen, halo, lower alkyl, hydroxy, lower alkoxy, mercapto-lower alkyl, amino, N-lower alkyl-amino, N,N-di-lower alkyl-amino, nitro, carboxy, lower carbalkoxy and cyano.

2. A compound selected from the group consisting of a compound having the following formula:

CH₃—[pyridine]—NH₂  
—CH₂—N(CH₃)—C(=C(CH₂CH₂OH)(S—CH=CH—CO—phenyl))  
CHO and the hydrochloride thereof.

TABLE III

| Compound No. | Dose, mg. | Hours after administration | | | | | | | | | |
|---|---|---|---|---|---|---|---|---|---|---|---|
| | | 0 | | 2 | | 4 | | 8 | | 24 | |
| | | μg./100 cc. | Percent | μg./100 cc. | Percent | μg./100 cc. | Percent | μg./100 cc. | Percent | μg./100 cc. | Percent |
| 1 | 200 | 5.84 | 100 | 6.00 | 102 | 6.6 | 113 | 6.10 | 104 | 5.90 | 100 |
| 2 | 100 | 5.84 | 100 | 16.80 | 288 | 14.6 | 250 | 9.76 | 167 | 6.80 | 116 |
| 3 | 100 | 5.84 | 100 | 10.39 | 178 | 9.37 | 160 | 9.22 | 157 | 7.18 | 123 |
| 4 | 100 | 5.84 | 100 | 23.70 | 405 | 21.60 | 369 | 11.70 | 200 | 5.98 | 102 |
| 5 | 100 | 5.84 | 100 | 26.50 | 453 | 23.30 | 398 | 17.70 | 303 | 14.00 | 239 |
| 6 | 100 | 5.84 | 100 | 22.10 | 378 | 22.70 | 388 | 14.70 | 251 | 7.60 | 131 |

From the table above it results that the S - vinyl derivatives of the invention possess a vitamin $B_1$ activity higher and more prolonged than that of thiamine hydrochloride administered at a double dose.

What we claim is:

1. A compound selected from the group consisting of a compound of the formula

CH₃—[pyridine]—NH₂  
—CH₂—N(CH₃)—C(=C(CH₂CH₂OH)(S—CH=C(R¹)—CO—R))  
CHO and a non-toxic acid addition salt thereof, wherein $R^1$ is selected from the group consisting of hydrogen, lower alkyl of from 1 to 3 carbon atoms and phenyl and R is selected from the group consisting of alkyl of from 1 to 3. The compound having the following formula:

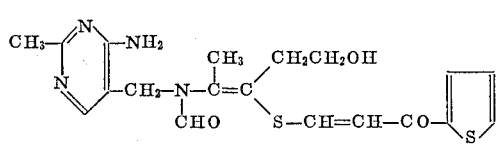

4. The compound having the following formula:

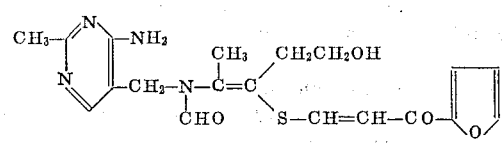

5. The compound having the following formula:

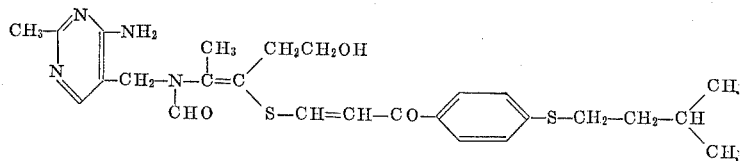

6. The compound having the following formula:

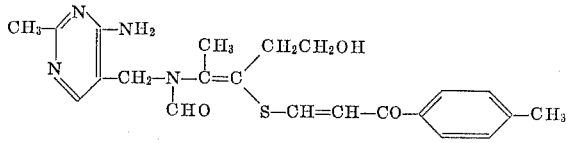

7. The compound having the following formula:

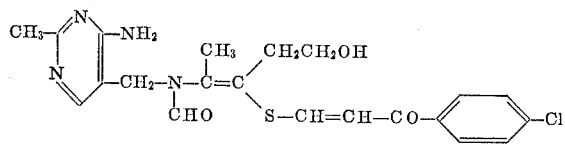

8. The compound having the following formula:

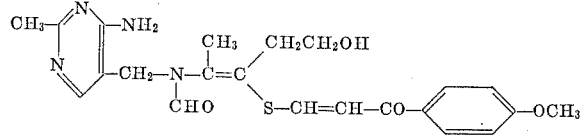

9. The compound having the following formula:

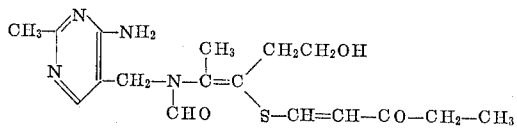

10. A compound as claimed in claim 1 which is a hydrochloride.

References Cited

Karrer: Organic Chemistry, 4th ed. p. 928, Elsevier Pub. Co. (1950).

Yashida: The Annual Report of Takeda Research Laboratory, vol. 13, pp. 1 and 16 (1961).

JOHN D. RANDOLPH, *Primary Examiner.*